United States Patent
Bao et al.

(10) Patent No.: US 10,021,543 B2
(45) Date of Patent: *Jul. 10, 2018

(54) SHORT MESSAGE SERVICE READING METHOD AND DEVICE

(71) Applicant: Xiaomi Inc., Beijing (CN)

(72) Inventors: Xiehao Bao, Beijing (CN); Jianchun Zhang, Beijing (CN); Jiankai Zhao, Beijing (CN)

(73) Assignee: Xiaomi Inc., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/214,573

(22) Filed: Jul. 20, 2016

(65) Prior Publication Data

US 2017/0086041 A1    Mar. 23, 2017

(30) Foreign Application Priority Data

Sep. 18, 2015   (CN) .......................... 2015 1 0600885

(51) Int. Cl.
*H04W 4/14*    (2009.01)
*H04L 29/06*   (2006.01)
(Continued)

(52) U.S. Cl.
CPC .......... *H04W 4/14* (2013.01); *G06F 21/6218* (2013.01); *G06F 21/6245* (2013.01); *G06Q 20/3255* (2013.01); *G06Q 20/385* (2013.01); *H04L 63/0428* (2013.01); *H04L 63/0838* (2013.01); *H04W 12/02* (2013.01); *G06F 21/42* (2013.01); *H04L 63/0853* (2013.01); *H04L 63/18* (2013.01); *H04W 12/08* (2013.01)

(58) Field of Classification Search
CPC .... H04W 4/14; H04W 12/02; H04L 63/0428; H04L 63/04; H04L 63/0838; G06Q 20/322; G06Q 20/3255; G06Q 20/385
USPC ........................ 455/466; 709/206; 726/28, 26
See application file for complete search history.

(56) References Cited

U.S. PATENT DOCUMENTS 8,543,821 B1   9/2013   Gabrielson
8,561,206 B1   10/2013  Paul et al.
(Continued)

FOREIGN PATENT DOCUMENTS

CN   101072093 A   11/2007
CN   101252748 A   8/2008
(Continued)

OTHER PUBLICATIONS

Extended European Search Report dated Dec. 6, 2016 for European Application No. 16184845.2, 19 pages.
(Continued)

*Primary Examiner* — Kamran Afshar
*Assistant Examiner* — Farid Seyedvosoghi
(74) *Attorney, Agent, or Firm* — Brinks, Gilson & Lione

(57) ABSTRACT

A Short Message Service (SMS) reading method and device are provided. The SMS reading method includes receiving a reading request for reading an SMS from a third party application, and when the SMS is determined to be an SMS including predetermined information, the predetermined information in the SMS may be hidden according to a security process for hiding the predetermined information. The processed SMS may be fed back to the third party application.

16 Claims, 15 Drawing Sheets

(51) Int. Cl.
*H04W 12/02* (2009.01)
*G06F 21/62* (2013.01)
*G06Q 20/32* (2012.01)
*G06Q 20/38* (2012.01)
*G06F 21/42* (2013.01)
*H04W 12/08* (2009.01)

(56) References Cited

U.S. PATENT DOCUMENTS

| | | | |
|---|---|---|---|
| 9,043,918 | B2 | 5/2015 | Bhattacharjee et al. |
| 2007/0043815 | A1* | 2/2007 | Tsang .................. G06Q 10/107 709/206 |
| 2009/0054038 | A1* | 2/2009 | Ranjan ................ G06F 21/6209 455/412.1 |
| 2009/0144829 | A1 | 6/2009 | Grigsby et al. |
| 2010/0115289 | A1* | 5/2010 | Han .................... G06F 21/6209 713/189 |
| 2011/0154040 | A1 | 6/2011 | Bheemanna |
| 2012/0157049 | A1 | 6/2012 | Eliovits et al. |
| 2012/0192287 | A1* | 7/2012 | Cai ....................... G06F 21/606 726/28 |
| 2012/0291103 | A1 | 11/2012 | Cohen |
| 2013/0014212 | A1 | 1/2013 | Cohen |
| 2013/0097203 | A1* | 4/2013 | Bhattacharjee ....... G06F 21/604 707/783 |
| 2013/0097652 | A1 | 4/2013 | Bhattacharjee et al. |
| 2014/0041038 | A1 | 2/2014 | Lessin et al. |
| 2014/0128047 | A1 | 5/2014 | Edwards et al. |
| 2014/0325601 | A1 | 10/2014 | Sun |
| 2014/0349625 | A1 | 11/2014 | Edwards et al. |
| 2015/0220734 | A1 | 8/2015 | Nalluri et al. |
| 2015/0237011 | A1 | 8/2015 | Bhattacharjee et al. |
| 2017/0208470 | A1* | 7/2017 | Hu ........................ H04W 12/08 |

FOREIGN PATENT DOCUMENTS

| | | |
|---|---|---|
| CN | 102103537 A | 6/2011 |
| CN | 102480726 A | 5/2012 |
| CN | 102810143 A | 12/2012 |
| CN | 102917346 A | 2/2013 |
| CN | 103079113 A | 5/2013 |
| CN | 103106578 A | 5/2013 |
| CN | 103116716 A | 5/2013 |
| CN | 103310135 A | 9/2013 |
| CN | 103310169 A | 9/2013 |
| CN | 103327492 A | 9/2013 |
| CN | 103514397 A | 1/2014 |
| CN | 103686716 A | 3/2014 |
| CN | 103761471 A | 4/2014 |
| CN | 103761472 A | 4/2014 |
| CN | 103916471 A | 7/2014 |
| CN | 104009977 A | 8/2014 |
| CN | 104125547 A | 10/2014 |
| CN | 104202735 A | 12/2014 |
| CN | 104640116 A | 5/2015 |
| CN | 104657674 A | 5/2015 |
| CN | 104768139 A | 7/2015 |
| EP | 2 028 829 A1 | 2/2009 |
| JP | 2004-102394 A | 4/2004 |
| JP | 2007-164613 A | 6/2007 |
| JP | 2008-125614 A | 6/2008 |
| JP | 2010-278852 A | 12/2010 |
| JP | 2012-046406 A | 3/2012 |
| JP | 2012-132296 A | 7/2012 |
| JP | 2013-045384 A | 3/2013 |
| JP | 2014-039193 A | 2/2014 |
| KR | 10-2014-0033567 A | 3/2014 |
| KR | 10-2015-0005343 A | 1/2015 |
| KR | 10-2015-0065083 A | 6/2015 |
| KR | 10-2015-0075349 A | 7/2015 |
| RU | 2 408 069 C2 | 12/2010 |
| RU | 2 524 868 C2 | 8/2014 |
| WO | WO 2006/001524 A1 | 1/2006 |
| WO | WO 2010/026540 A1 | 3/2010 |
| WO | WO 2010/145811 A1 | 12/2010 |
| WO | WO 2013/055501 A1 | 4/2013 |

OTHER PUBLICATIONS

International Search Report and Written Opinion dated May 17, 2016 for International Application No. PCT/CN2015/099988, 8 pages.
Mulliner, Collin et al, "SMS-Based One-Time Passwords: Attacks and Defense," Network and Parallel Computing, K. Rieck et al. (Eds.), Springer-Verlag, DIMVA 2013, LNCS 7967, 2013, pp. 150-159.
Office Action dated Jan. 29, 2018 for Japanese Application No. 2016-556782, 5 pages.
Office Action dated Nov. 21, 2017 for Russian Application No. 2016135920/08, 13 pages.
Office Action dated Nov. 23, 2017 for Russian Application No. 2016135980/07, 10 pages.
Office Action dated Dec. 5, 2017 for Russian Application No. 2016132970/08, 13 pages.
English Translation of International Search Report dated Jun. 7, 2016 for International Application No. PCT/CN2015/099986, 2 pages.
English Translation of International Search Report dated Jun. 22, 2016 for International Application No. PCT/CN2015/100007, 2 pages.
English Translation of International Search Report dated May 18, 2016 for International Application No. PCT/CN2015/099988, 2 pages.
Extended European Search Report dated Feb. 8, 2017 for European Application No. 16176449.3, 10 pages.
Extended European Search Report dated Nov. 7, 2016 for European Application No. 16175767.9, 7 pages.
Office Action dated Jul. 17, 2017 for Korean Application No. 10-2016-7028071, 9 pages.
Office Action dated Aug. 28, 2017 for Chinese Application No. 201510600885.3, 8 pages.
Partial European Search Report dated Nov. 7, 2016 for European Application No. 16176449.3, 6 pages.
Written Opinion dated Jun. 22, 2016 for International Application No. PCT/CN2015/100007, 3 pages.
Written Opinion dated Jun. 7, 2016 for International Application No. PCT/CN2015/099986, 3 pages.
Office Action dated Sep. 4, 2017 for Chinese Application No. 201510599836.2, 21 pages.
Office Action dated Oct. 31, 2017 for Japanese Application No. 2016-556275, 3 pages.
Office Action dated Nov. 21, 2017 for Japanese Application No. 2016-556266, 11 pages.
Office Action dated Feb. 27, 2018 for Chinese Application No. 201510599211.6, 8 pages.
Office Action dated Apr. 16, 2018 for Chinese Application No. 201510599836.2, 10 pages.
Office Action dated Apr. 25, 2018 for Chinese Application No. 201510600885.3, 10 pages.

* cited by examiner

SHORT MESSAGE SERVICE READING METHOD AND DEVICE

CROSS-REFERENCE TO RELATED APPLICATIONS

The present application claims priority to Chinese patent application No. 201510600885.3, filed on Sep. 18, 2015, the entirety of which is hereby incorporated by reference herein.

TECHNICAL FIELD

The embodiments of the present disclosure relate to the field of information security, particularly to a method and device for reading a Short Message Service (SMS).

BACKGROUND

In an operating system running on a computing device, a third party application may be authorized to read an SMS. In situations where the third party application is actually a malicious application, the third party application may read a verification code in the SMS and acquire an authority of executing a predetermined operation, such as an authority of executing a payment operation, and an authority of executing registration and login and so on, which may not be authorized or intended by a user.

SUMMARY

A method for reading an SMS is provided according to a first embodiment of the present disclosure. The method may include a reading request of reading an SMS is received from a third party application, when the SMS is an SMS carrying predetermined information, the predetermined information in the SMS is hidden, and the processed SMS is fed back to the third party application.

A device for reading an SMS may be provided according to a second exemplary embodiment of the present disclosure. The device may include a processor and a memory configured to store an instruction executable by the processor. The processor may be configured to execute the instructions to receive from a third party application a reading request of reading an SMS, when the SMS is an SMS carrying predetermined information, hide the predetermined information in the SMS, and feed back the processed SMS to the third party application.

A non-transitory computer-readable storage medium may be provided according to a third exemplary embodiment of the present disclosure, having stored therein instructions that, when executed by a processor of a mobile terminal, causes the mobile terminal to perform the method for reading a Short Message Service (SMS) that may include may include a reading request of reading an SMS is received from a third party application, when the SMS is an SMS carrying predetermined information, the predetermined information in the SMS is hidden, and the processed SMS is fed back to the third party application.

DETAILED DESCRIPTION

Figure 1:
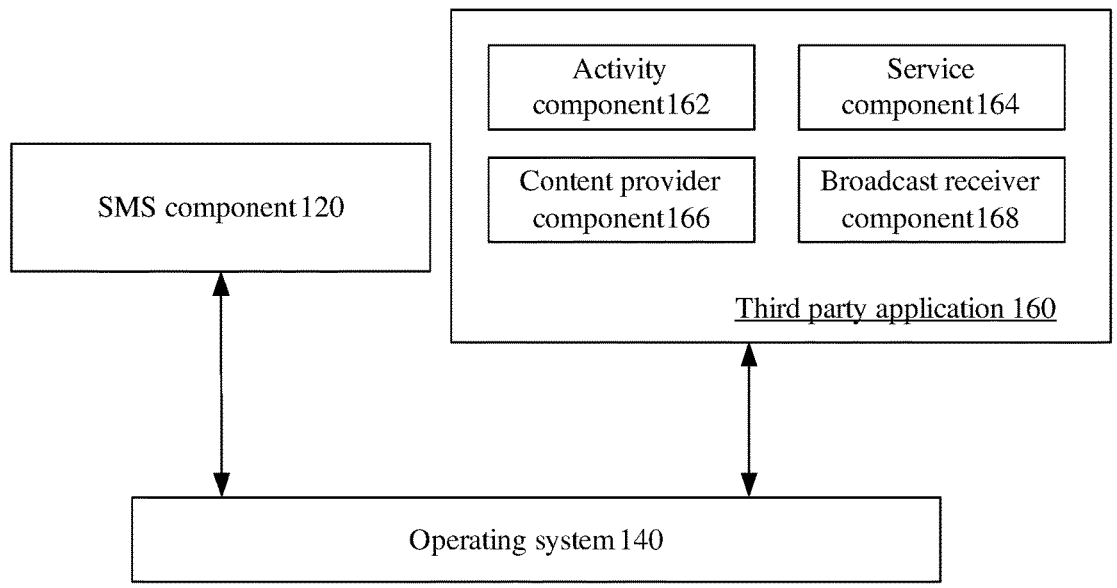
FIG. 1 shows a schematic diagram of components of a mobile terminal according to an exemplary embodiment.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims. The methods, devices, systems, and other features discussed below may be embodied in a number of different forms. Not all of the depicted components may be required, however, and some implementations may include additional, different, or fewer components from those expressly described in this disclosure. Variations in the arrangement and type of the components may be made without departing from the spirit or scope of the claims as set forth herein. Further, variations in the processes described, including the addition, deletion, or rearranging and order of logical operations, may be made without departing from the spirit or scope of the claims as set forth herein.

The following provides exemplary descriptions for several terms involved in the embodiments of the present disclosure.

Android operating system: a Linux-based operating system of free and open source codes, which is produced by Google and mainly applied to a mobile device. The mobile device may be a mobile phone, a tablet computer, an electronic book reader, a Moving Picture Experts Group Audio Layer III (MP3) player, a Moving Picture Experts Group Audio Layer IV (MP4) player, a portable laptop computer and so on.

Application: an application generally includes at least one program component in an operating system running on a mobile device (e.g., Android operating system). There may be four program components included as part of the application, which are an activity component, a service component, a content provider component and a broadcast receiver component.

Activity component: which is a component responsible for interacting with a user in an application (e.g., Android application) and providing a visible user interface for the application, where information may be requested of a user and information may be received from the user via the user interface. An application (e.g., Android application) may include one or more activity components.

Service component: which is a component operating in the background of an operating system and/or application and may not be responsible for providing a user interface in an application (e.g., Android application) because the service component may not be configured to interact directly with a user of the application. An application (e.g., Android application) may include one or more service components configured to implement specific tasks for the application. For example, when the application is a clock application, a service component for the clock application may be configured to obtain a system time from the operating system (e.g., Android) on which the application is running.

Content provider component: which is a component configured to provide data, such as an SMS, a tone, a piece of wallpaper, contacts and so on, for other applications or for other components in a current application in an application (e.g., Android application). The content provider component can encapsulate data in various formats and provide the data to other applications or components in a standard form, wherein an SMS component in the embodiments of the present disclosure is an exemplary content provider component.

Broadcast receiver component: which is configured to receive and respond to a message that is broadcast by an operating system. The broadcast receiver component can receive a message of interest (or a message of a predefined message type) and then process and forward the message to other components in a current application. The message of interest may be a short messaging service (SMS) message. For example, when a status of sensors on included on the mobile device running the application changes, the operating system may broadcast the status change such that the application may receive the status change information. A navigation based application may need to know the status of a global positioning sensor (GPS), and therefore the navigation based application may set up a broadcast receiver component to identify and receive messages related to GPS that are broadcast by the operating system.

Third party application: which is an application distinguishable from preinstalled applications of an operating system in a mobile device.

FIG. 1 shows a schematic diagram of components of a mobile device 100 according to an exemplary embodiment. The mobile device 100 includes an SMS component 120, an operating system 140 and a third party application 160. The operating system 140 may be configured to receive a reading request sent by the third party application 160 for reading an SMS, and forward the reading request to the SMS component 120 in response to receiving the reading request. Although a short messaging service (SMS) type of message is referred to in the exemplary embodiments described herein, the features described in this disclosure are also applicable when the SMS message is replaced by another type of electronic message such as an email, electronic instant messaging, electronic multimedia messaging service (MMS) messages, or other electronic message generated by an electronic messenger application and transmitted through a communication network.

The mobile device 100 may be a mobile phone, a tablet computer, an electronic book reader, an MP3 player, an MP4 player, a portable laptop computer and so on.

The SMS component 120 may be a content provider component in an application (e.g., Android application) running on the mobile device 100, where the SMS component 120 may be configured to provide SMS data for other applications or other components in a current application. The SMS component 120 may receive an SMS sent by a source party, and store received SMSs in a memory of the mobile device 100 to form an SMS list.

The operating system 140 may pre-store a configuration file, where the configuration file stores an SMS reading authority of the third party application 160 at the operating system level. The SMS reading authority may include one or more authority rules that identify a reading authority assigned to the third party application 160, as well as other applications, running on the mobile device 100. The reading authority may identify certain SMS content that may, or may not, be read from the SMS component 120.

Alternatively, or in addition, the operating system 140 may store a general configuration file. The general configuration file may store SMS reading authorities of all third party applications running on the mobile device 100, including the third party application 160, at the operating system level.

Alternatively, or in addition, the operating system 140 may store a plurality of configuration files, and the plurality of configuration files may store SMS reading authority of each third party application running on the mobile device 100, including the third party application 160, at the operating system level respectively.

The third party application 160, when the SMS reading authority is included at the operating system level, may be authorized to read all SMSs in the SMS component 130, and the third party application 160 without the SMS reading authority at the operating system level cannot read any SMS in the SMS component 120.

The third party application 160 may include one or more program components, including an activity component 162, a service component 164, a content provider component 166, or a broadcast receiver component 168.

When the third party application 160 is configured, and/or authorized, to read an SMS in the SMS component 120, the third party application 160 may transmit a reading request for reading the SMS to the operating system 140 first. After receiving the reading request, the operating system 140 may determine whether the third party application 160 is in an SMS reading authority list, and when the third party application 160 is determined to be in the SMS reading authority list (thus authorizing the third party application 160 to read the SMS in the SMS component 120), the operating system 140 may forward to the SMS component 120 the SMS reading request transmitted by the third party application 160. After receiving the reading request forwarded by the operating system 140, the SMS component 120 may search for the SMS to be read as identified in the reading request. The SMS component 120 may, for example, search for the SMS from a list of SMS messages stored in a memory accessible by the SMS component 120. After locating and accessing the SMS to be read, the SMS component 120 may then feed back the SMS to be read to the third party application 160 through the operating system 140.

Figure 2:
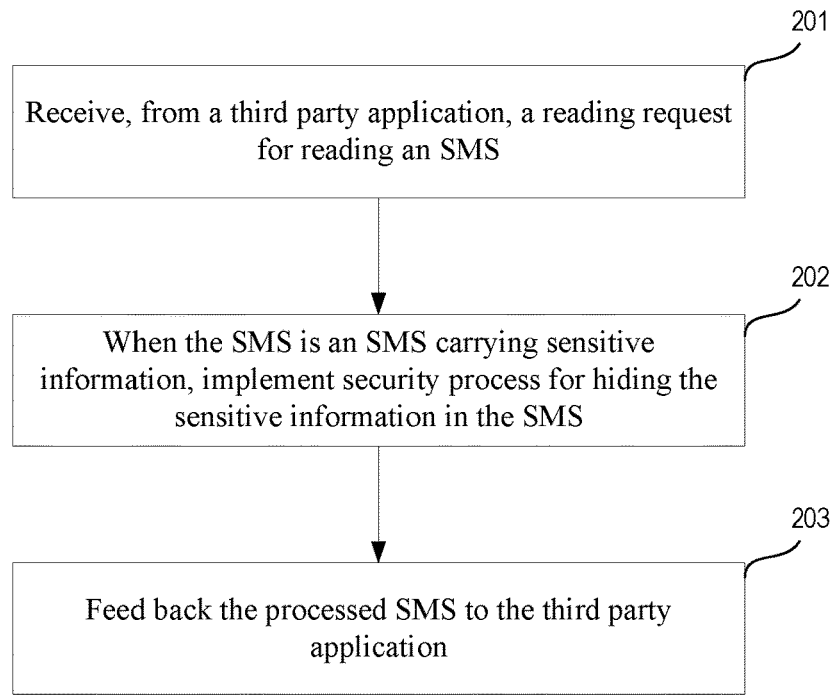
FIG. 2 shows a flowchart of an SMS reading method according to an exemplary embodiment.

FIG. 2 shows a flowchart 200 of logic for a mobile device implementing an SMS reading method according to an exemplary embodiment. The SMS reading method may be implemented, for example, on the mobile device 100 shown in FIG. 1. The SMS reading method may include several processes, including those provided as follows.

At 201: A reading request for reading an SMS is received from a third party application by an operating system running on the mobile device 100.

The third party application may be an application in a configuration file of the operating system running on the mobile device 100, and the configuration file may be a file for performing authority control according to an application granularity level. Specifically, the authority for the third party application to access other resources (such as another application) is set in the configuration file at the application level. Thus the authority of the third party application access application such as an SMS application via the operating system configuration file is all or nothing: the operating system either may either allow the third party application to access the all functionality or all messages of the SMS application or completely deny access. The configuration file from the operating system is not suitable to control access below the application level, e.g., one SMS application function or an individual message by the third party application. The embodiment shown in FIG. 2, however, allows for access control at sub-application level, e.g., within the SMS application.

At 202: When the SMS is an SMS including predetermined information, a security process may be implemented for formatting the predetermined information in the SMS. The predetermined information described in this disclosure may be, for example, representative of a password, account number for a financial institution, or an account number for a credit card, or other information that may be considered sensitive information for a user. The sensitive information may further include, for example, CAPTCHA or verification code information that has been pushed to the third party application by an application server of the third party application, the user's private information, keywords that are preset by the user, or temporary passwords that are pushed to the third party application by financial institutions.

The format processing may be at least encrypting the predetermined information in the SMS so that the predetermined information in the SMS is rendered into a non-visible state.

At 203: The processed SMS may be fed back to the third party application.

It follows that according to the SMS reading method provided by the flowchart 200, a reading request for reading an SMS may be received from a third party application; when the SMS is determined to include predetermined information, a security process may be implemented for hiding the predetermined information in the SMS; and the processed SMS may be fed back to the third party application. Therefore, the SMS reading method provided by flowchart 200 may solve a problem that a malicious application can read a verification code in an SMS to acquire an authority of executing a predetermined operation due to a third party application (where the third party application may only have an SMS reading authority at the operating system level) being able to read predetermined information content from an SMS stored in an SMS component. The SMS reading method provided by flowchart 200 may also, in particular, prohibit a third party application from reading an SMS determined to include predetermined information, thus avoiding leakage of the predetermined information in the SMS while implementing authority control over a single SMS granularity.

Figure 3A:
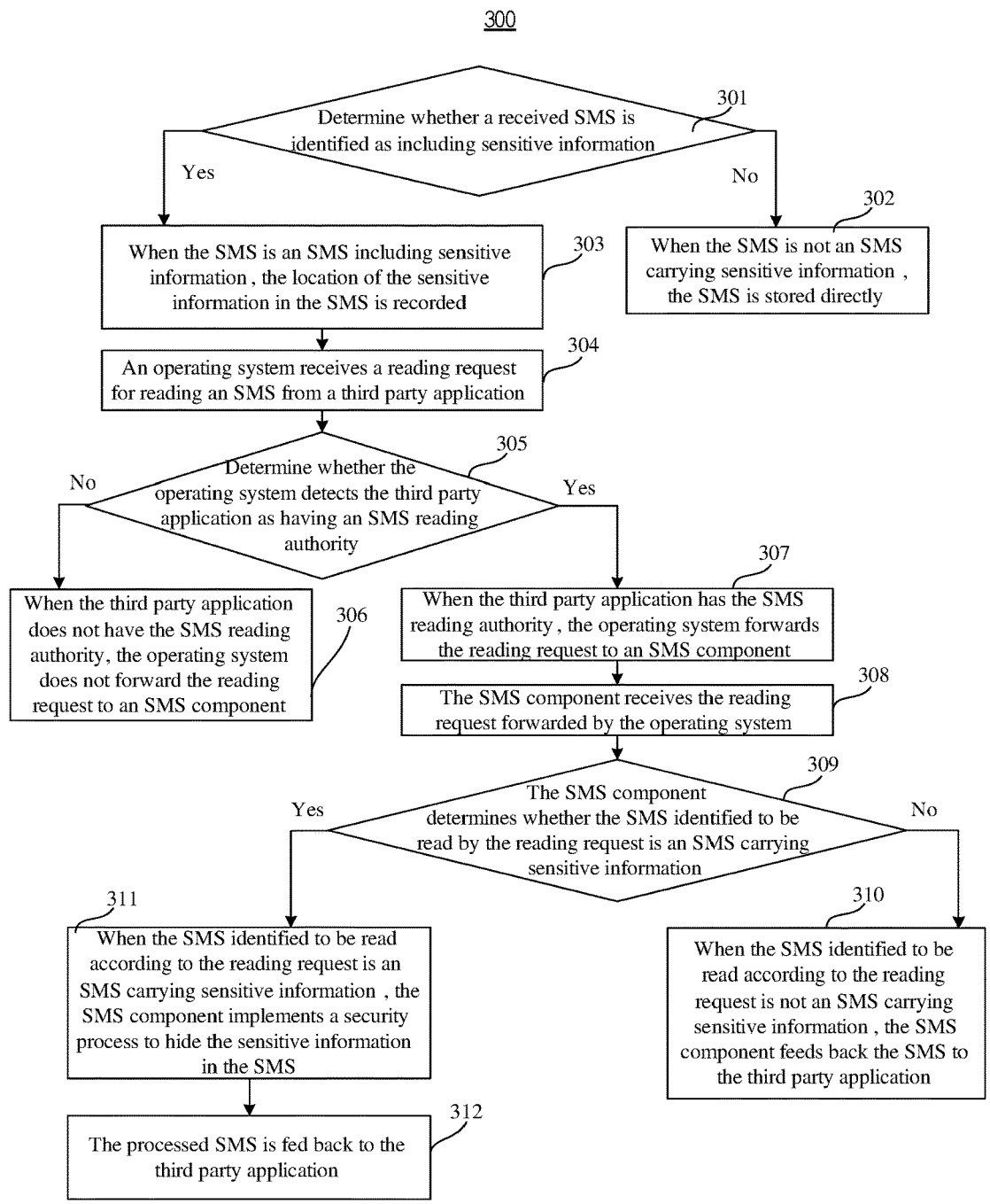
FIG. 3A shows a flowchart of an SMS reading method according to another exemplary embodiment.

FIG. 3A shows a flowchart 300 of logic for a mobile device implementing an SMS reading method according to another exemplary embodiment. The present embodiment illustrates the SMS reading method applied in the mobile device 100 in the implementation environment as shown in FIG. 1 as an example. The SMS reading method may include several processes, including those provided as follows.

At 301: A determination as to whether a received SMS is an SMS carrying predetermined information may be implemented.

The predetermined information may be information related to properties and/or a control authority of a user.

The SMS component may receive an SMS sent by an SMS source party and determine whether the received SMS includes predetermined information. SMS messages that are determined to include predetermined information may be identified as such Determining whether the received SMS includes predetermined information may include the SMS component determining whether the SMS is an SMS carrying predetermined information based on characteristic information of the SMS, wherein the characteristic information may include at least one of a sender number, an SMS content or an SMS template.

At 302: When the SMS is determined not to include predetermined information, the SMS may be stored directly. For example, the SMS may be stored directly into a memory of the mobile device 100.

At 303: When the SMS is determined to include predetermined information, the location of the predetermined information in the SMS may be recorded.

When a determination indicates that the SMS includes predetermined information, the SMS component may record the location of the predetermined information within the SMS. For example, the SMS may be analyzed to determine the SMS is configured according to a known SMS template. The known SMS template may include predefined locations for including information. The location of the predetermined information within the SMS may therefore be determined according to known predefined locations for including predetermined information in the known SMS template corresponding to the SMS including the predetermined information.

The SMS component may identify the SMS as an SMS carrying predetermined information.

Figure 3B:
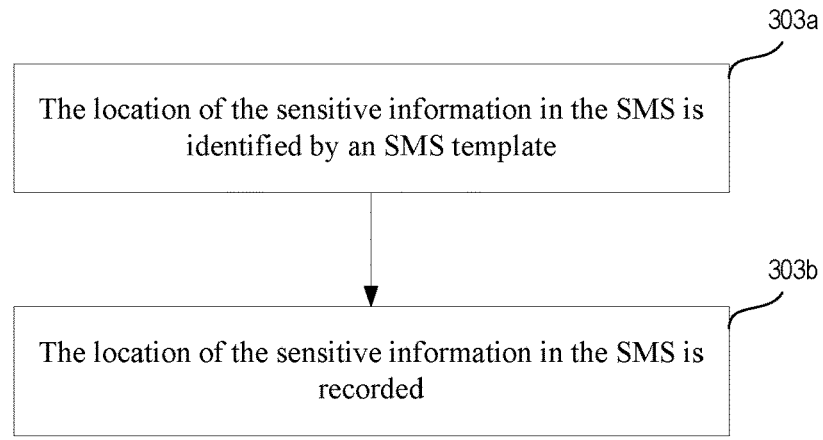
FIG. 3B shows a flowchart of sub-steps of an SMS reading method according to still another exemplary embodiment.

In the present embodiment, the process 303 may include the following sub-processes, as shown in FIG. 3B.

At 303a: The location of the predetermined information within the SMS may be identified according to an SMS template corresponding to the SMS. Each SMS template may include information identifying location of certain predefined data fields.

For example, an SMS template may identify the location of a data field for including the predetermined information in the SMS, where the SMS template includes predefined locations for including predetermined information on the. The SMS component may pre-store a plurality of SMS templates that include predetermined information and store information that identifies the location of predetermined information within the corresponding SMS templates. For example, an SMS template may include a data field that includes alphanumerical information such as, "you are paying with Xiaomi Company, and the payment code is xxxxx", then the SMS component may store the SMS template and store information indicating that the location of predetermined information (represented by xxxxx) is six numbers after keywords "the payment code is". The location information of the predetermined information may be stored in a corresponding location of the SMS template. After identifying attributes of the SMS, the SMS component may match the SMS that is determined to include predetermined information with a stored SMS template to determine an SMS template of the SMS. By determining the SMS template of the SMS, the SMS component may acquire the location of the predetermined information in the SMS.

At 303b: The storage location of where the predetermined information is stored may be indicated by a location indicator included in the SMS or as additional information associated with the SMS.

For example, the SMS component may record the location indicator within a specified location of the SMS itself, where the location indicator may directly identify the storage location of the predetermined information (e.g., data storage location) or identify information that may be relied on to identify the storage location of the predetermined information. In addition or alternatively, the SMS component may generate the location indicator as additional information associated with the SMS and stored on the mobile device 100.

At 304: The operating system may receive from the third party application a reading request for reading an SMS.

When the third party application is operated to read an SMS stored in the SMS component (or otherwise accessible by the SMS component), the third party application may transmit the reading request for reading the SMS to the operating system first. Accordingly, the operating system receives the reading request for reading the SMS from the third party application.

Here, the third party application may be an SMS-class application, a payment-class application, a registration-class application, or other like application.

At 305: The operating system may determine whether the third party application that transmitted the reading request has an SMS reading authority.

The operating system may pre-store SMS reading authorities of third party applications. For example, the pre-stored SMS reading authorities may be a pre-stored configuration file (e.g., authority list) that identifies one or more third party applications and their corresponding authority rights for reading SMS messages. Then, when receiving the reading request for reading the SMS from the third party application, the operating system may acquire and parse a pre-stored configuration file first, and determine whether the third party application is in the pre-stored configuration file. When the third party application is in the pre-stored configuration file, the third party application may be determined to have an SMS reading authority. Otherwise, the third party application may be determined not to have the SMS reading authority for reading the SMS identified in the reading request.

At 306: When the third party application does not have the SMS reading authority, the operating system may not forward the reading request to the SMS component.

At 307: When the third party application has the SMS reading authority, the operating system may forward the reading request to the SMS component.

When it is detected by the operating system that the third party application has the SMS reading authority at the operating system level, the operating system forwards the reading request of the third party application to the SMS component.

At 308: The SMS component may receive the reading request forwarded by the operating system.

For example, a third party application named "Xiaomi Mall" may send to the operating system, an SMS reading request for reading an SMS containing a payment password of "Xiaomi payment", then after receiving the reading request, the operating system may determine whether "Xiaomi Mall" is a third party application having an SMS reading authority in the operating system, and when "Xiaomi Mall" is determined to have the proper SMS reading authority, the operating system may forward the reading request sent by "Xiaomi Mall" to the SMS component, and the SMS component may receive the reading request forwarded by the operating system.

At 309: The SMS component may determine whether the SMS to be read according to the reading request is an SMS including predetermined information.

For example, the SMS component may acquire, according to the received reading request, the SMS to be read according to the reading request and determine whether the SMS to be read according to the reading request carries a marker. When the marker is determined to be carried by the SMS to be read, the SMS to be read is determined to be an SMS including predetermined information. Otherwise, the SMS is determined not to be an SMS including predetermined information.

At 310: When the SMS to be read according to the reading request is determined not to include predetermined information, the SMS component may feed back the SMS to be read to the third party application.

At 311: When the SMS to be read according to the reading request is determined to include predetermined information, the SMS component may implement a security process for hiding the predetermined information within the SMS to be read.

Figure 4A:
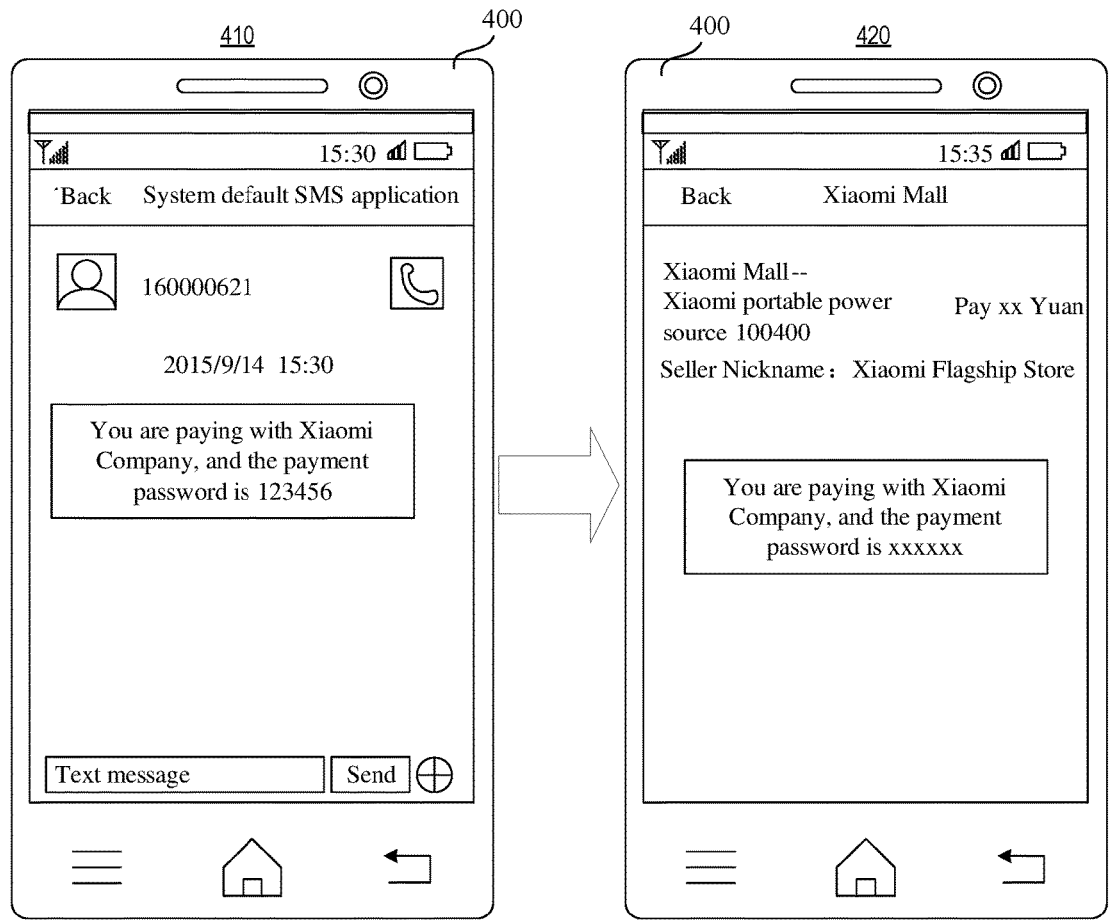
FIG. 4A shows a schematic diagram of an interface for hiding predetermined information according to an exemplary embodiment.

The hiding may include at least replacing the predetermined information in the SMS with a preset symbol. For example, FIG. 4A shows an exemplary hiding process implemented on exemplary mobile device 400. The hiding process receives a first SMS content stating "you are paying with Xiaomi Company, and the payment password is 123456" in a first user interface (UI) 410, and transforms the first SMS content to a second SMS content in a second user interface (UI) 420 stating "you are paying with Xiaomi Company, and the payment password is XXXXXX" according to an exemplary hiding process.

Figure 4B:
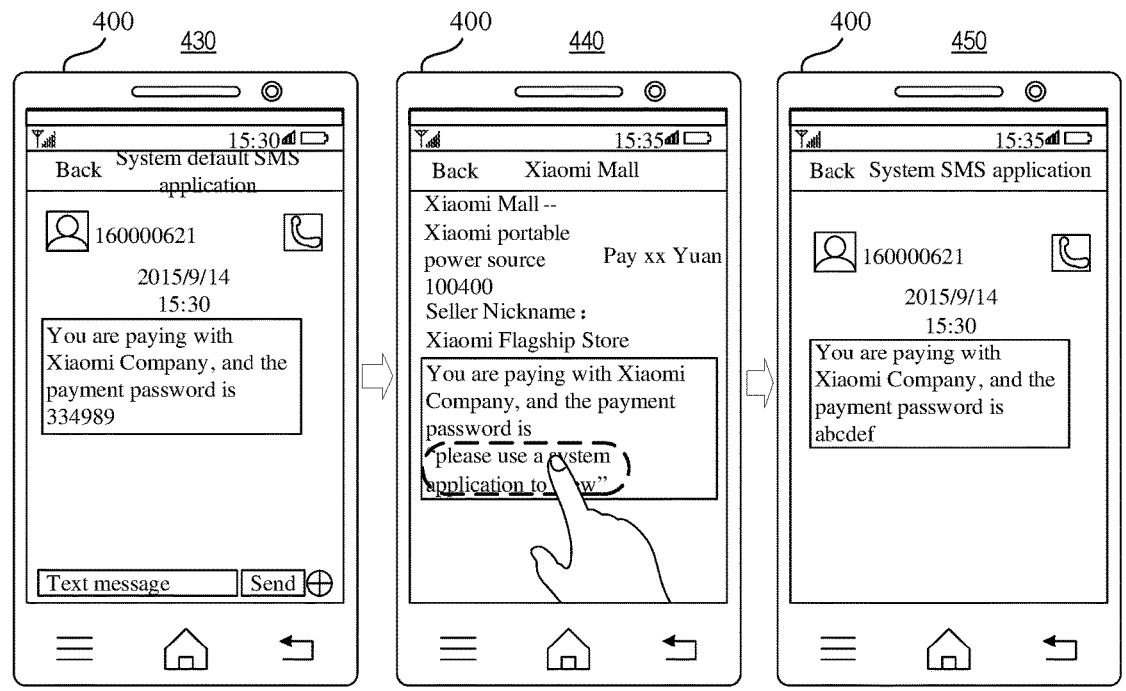
FIG. 4B shows a schematic diagram of an interface for hiding predetermined information according to another exemplary embodiment.

Alternatively, the hiding process may include at least replacing the predetermined information in the SMS with preset prompt information. The preset prompt information may be used for prompting a user to use a designated application to view the predetermined information. For example, FIG. 4B shows an exemplary hiding process implemented on exemplary mobile device 400. The hiding process receives a third SMS content stating "you are paying with Xiaomi Company, and the payment password (e.g., predetermined information) is 334989" in a third user interface (UI) 430, and transforms the third SMS content to a fourth SMS content in a fourth user interface (UI) 440 stating "you are paying with Xiaomi Company, and please use a system SMS application to view the payment password" according to an exemplary hiding process.

The preset prompt information may be a hyperlink. When triggered, the hyperlink may redirect the mobile device 400 to a designated application to view the predetermined information that was hidden by a hiding process described herein.

Alternatively, the hiding processing may be at least encrypting the predetermined information in the SMS. For example, FIG. 4B shows an exemplary hiding process implemented on exemplary mobile device 400. The hiding process receives the third SMS content stating "you are paying with Xiaomi Company, and the payment password is 334989" in a third user interface (UI) 430, and transforms the third SMS content to a fifth SMS content in a fifth user interface (UI) 450 stating "you are paying with Xiaomi Company, and the payment password is abcdef" according to an exemplary hiding process, where the "abcdef" is an encryption form of the payment password type of payment password "334989" that is displayed on the fifth user interface (UI) 450.

At 312: The processed SMS may be fed back to the third party application.

For example, the SMS component implements the SMS including the predetermined information to a hiding processing as described herein, and then feeds back the processed SMS to the third party application.

Processes 301-303 and processes 304-308 are not limited to specific sequences in the present embodiment. In other words, the processes that the SMS component identifies whether the SMS is an SMS including predetermined information may be performed after the step that the reading request forwarded by the operating system is received, and determining whether the SMS includes predetermined information may be pre-identified before the reading request forwarded by the operating system is received.

In the SMS reading method provided in the embodiment of the present disclosure, a reading request for reading an SMS may be received from a third party application, and when the SMS is determined to include predetermined information, the predetermined information in the SMS may be hidden according to implementation of a security process for hiding the predetermined information. The processed SMS from the hiding process may be fed back to the third party application, thereby solving the problem where a malicious application is allowed to read a verification code in an SMS to acquire an authority of executing a predetermined operation. This problem may exist where a third party application only having an SMS reading authority at the operating system level is allowed to read the content of an SMS in an SMS component. The solutions described herein thus avoids leakage of the predetermined information in the SMS while implementing authority control over a single SMS granularity.

The location of the predetermined information within the corresponding SMS may be recorded and the content of the predetermined information may be hidden, thus avoiding leakage of the predetermined information included in the SMS. In the meanwhile, only an SMS carrying predetermined information may be subject to the hiding process for hiding predetermined information included in the SMS, thereby implementing authority control over a single SMS granularity.

Only the processing of predetermined information in an SMS is added in the SMS component, thereby implementing authority control over a single SMS granularity, and achieving the effect of simple and convenient operation and easy implementation.

In the embodiment of FIG. 3A, the SMS component may identify whether the SMS includes predetermined information according to methods described herein.

Alternatively, the SMS component may identify, according to a sender's corresponding identification number of the received SMS (e.g., telephone number, user identification number), whether the SMS includes predetermined information. Generally, a list may be stored in an SMS background server. For example, the list stores company A and SMS identification number 1 and SMS identification number 2 which are SMS identification numbers corresponding to company A, company B and SMS identification number 3 and SMS identification number 4 which are SMS numbers corresponding to company B, company C and SMS identification number 5 and SMS identification number 6 which are SMS numbers corresponding to company C, and so on.

Exemplarily, the list stored in the SMS background server is as shown in the following Table 1.

TABLE 1

| Company name | SMS number |
| --- | --- |
| Company A | SMS number 1 |
|  | SMS number 2 |
| Company B | SMS number 3 |
|  | SMS number 4 |
| Company C | SMS number 5 |
|  | SMS number 6 |

When the sender number of the SMS received by the SMS component is SMS identification number 5, it can be learned from the corresponding relations in Table 1 that a source party of the SMS is company C, and the SMS component identifies the SMS as an SMS carrying predetermined information.

Alternatively, the SMS component may identify, according to an SMS content of the received SMS, whether the SMS carries predetermined information. For example, the SMS content is "[Asan Travel·Go] 06-22 07:15 Kunming Changshui Airport—take-off-08:55 to Chongqing Jiangbei Airport 2B landing Lucky Airlines 8L9863, Order paying, Zhang Wuji (Ticket number: XXX-XXXXXXXXXX) Clink on http://tb.cn/3eXI06y, and check details of the flight on the client.", then the SMS component identifies, according to keywords [Asan Travel·Go] in the SMS content, that the SMS is an SMS carrying predetermined information.

Alternatively, the SMS component may also identify, according to an SMS template, whether the SMS carries predetermined information. For example, the SMS component pre-stores a plurality of SMS templates carrying predetermined information. When the SMS is received, the SMS component matches the received SMS with a stored SMS template. When the received SMS is matched with a certain SMS template, the SMS is identified as an SMS carrying predetermined information.

For example, SMS 1: sender: 140000621 "[Company A] order number paying, the verification number is XXXXX. Click on http://tb.cn/3eXI06y, and check details on the client."

SMS 2: sender: 140000622 "[Company A] order number paying, the verification code is Click on http://tb.cn/3eXI06y, and check details on the client."

SMS 1 and SMS 2 are SMSs sent by Jingdong Company, a source party identifier of SMS 1 is "140000621", a source party identifier of SMS 2 is "140000622" and the two source parties have the same prefix "1400062". In the meanwhile, the two SMSs contain a keyword "[Company A]".

Exemplarily, two SMS templates constructed by SMS 1 and SMS 2 are as follows.

<payment template 1> □ "[Company A]<Order number> <Verification code>."

<Payment template 2> □ "[Company A]<Order number> <Verification code>."

For example, corresponding relations between extracted templates and combinations of identification characteristics and keywords of the source parties of the SMSs are as shown in the following Table 2.

TABLE 2

| SMS characteristic | SMS template |
| --- | --- |
| 14000062X + [Company A] | <payment template 1> |
| 14000062X + [Company A] | <payment template 2> |

When the SMS received by the SMS component carries a characteristic of "14000062X+[Company A]", the SMS will be matched with <payment template 2> in the SMS templates. Therefore, the SMS component identifies the SMS as an SMS carrying predetermined information.

For example, after a product is purchased in Xiaomi Mall, an order is submitted by clicking, acquisition of a verification code from a mobile phone is selected during payment, and a mobile phone bound with the website of Xiaomi Mall will receive a verification code-carried SMS sent by Xiaomi Company within 60 seconds. Provided that the received SMS is: Sender: 160000621 "[Xiaomi Company] Order number 1111111 Paying, the verification code is 123456, please input the verification code within 5 minutes."

A third party application "Xiaomi Mall" may send a reading request to the operating system. The operating system may forward, to the SMS component, the reading request sent by the third party application. After acquiring the reading request, the SMS component may process the content in the SMS as "[Xiaomi Company] Order number 1111111 paying, the verification code is XXXXX, please input the verification code within 5 minutes." and feed back the SMS to the third party application "Xiaomi Company".

Alternatively, after acquiring the reading request, the SMS component may process the content in the SMS as "[Xiaomi Company] Order number 1111111 paying, the verification code is abcdef, please input the verification code within 5 minutes." and feed back the SMS to the third party application "Xiaomi Company".

Figure 5:
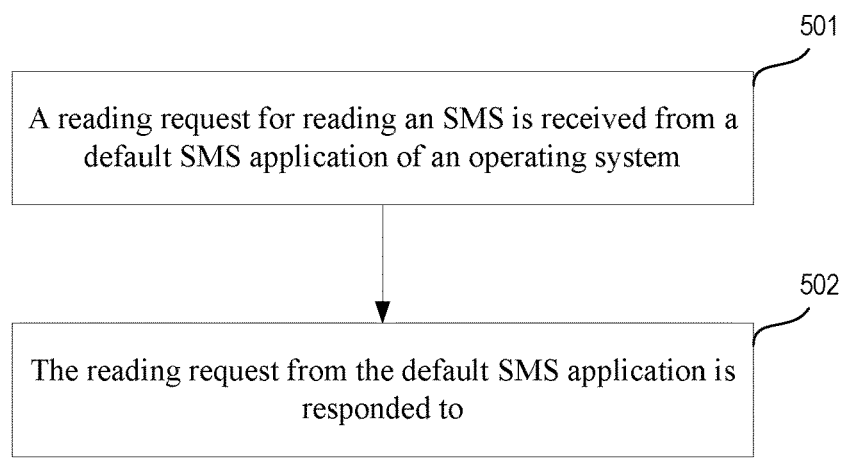
FIG. 5 shows a flowchart of an SMS reading method according to still another exemplary embodiment.

In the embodiment of FIG. 3A, reading requests forwarded by the operating system to the SMS component may be reading requests sent by third party applications while a default SMS application of the operating system may also read the SMS content of the SMS component, as shown in flowchart 500 in FIG. 5.

At 501: A reading request for reading the SMS may be received from a default SMS application of the operating system.

For example, the SMS component may receive a reading request sent by a default SMS application of the operating system, so as to read an SMS stored in the SMS component, or otherwise accessible by the SMS component.

At 502: The reading request from the default SMS application may be responded to.

After receiving the reading request sent by the default SMS application, the SMS component may respond to the reading request directly.

The default SMS application may include a preinstalled SMS application of the mobile device running the operating system, or other trusted SMS applications.

Figure 6:
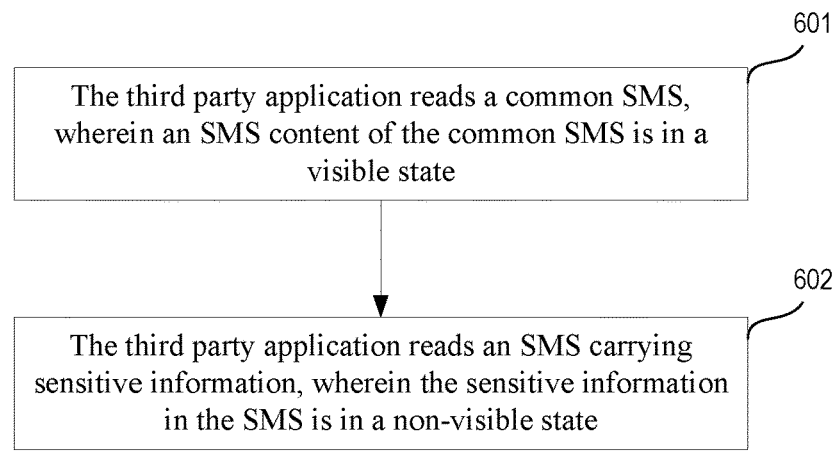
FIG. 6 shows a flowchart of an SMS reading method according to still another exemplary embodiment.

Since SMSs in the SMS component may be divided into SMSs including predetermined information and common SMSs that do not include predetermined information, there may be two situations in which the third party application may read an SMS in the SMSs, as shown in flowchart 600 in FIG. 6.

At 601: The third party application may read a common SMS, wherein an SMS content of the common SMS is in a visible state. The visible state may allow certain identified SMS content to be displayed on a user interface of the corresponding mobile terminal.

The common SMS refers to an SMS not including predetermined information, and the SMS content thereof may therefore be reverted, or remain, in a visible state. The third party application then only requires an SMS reading authority at the operating system level so as to read the common SMS in the SMS component.

Figure 7A:
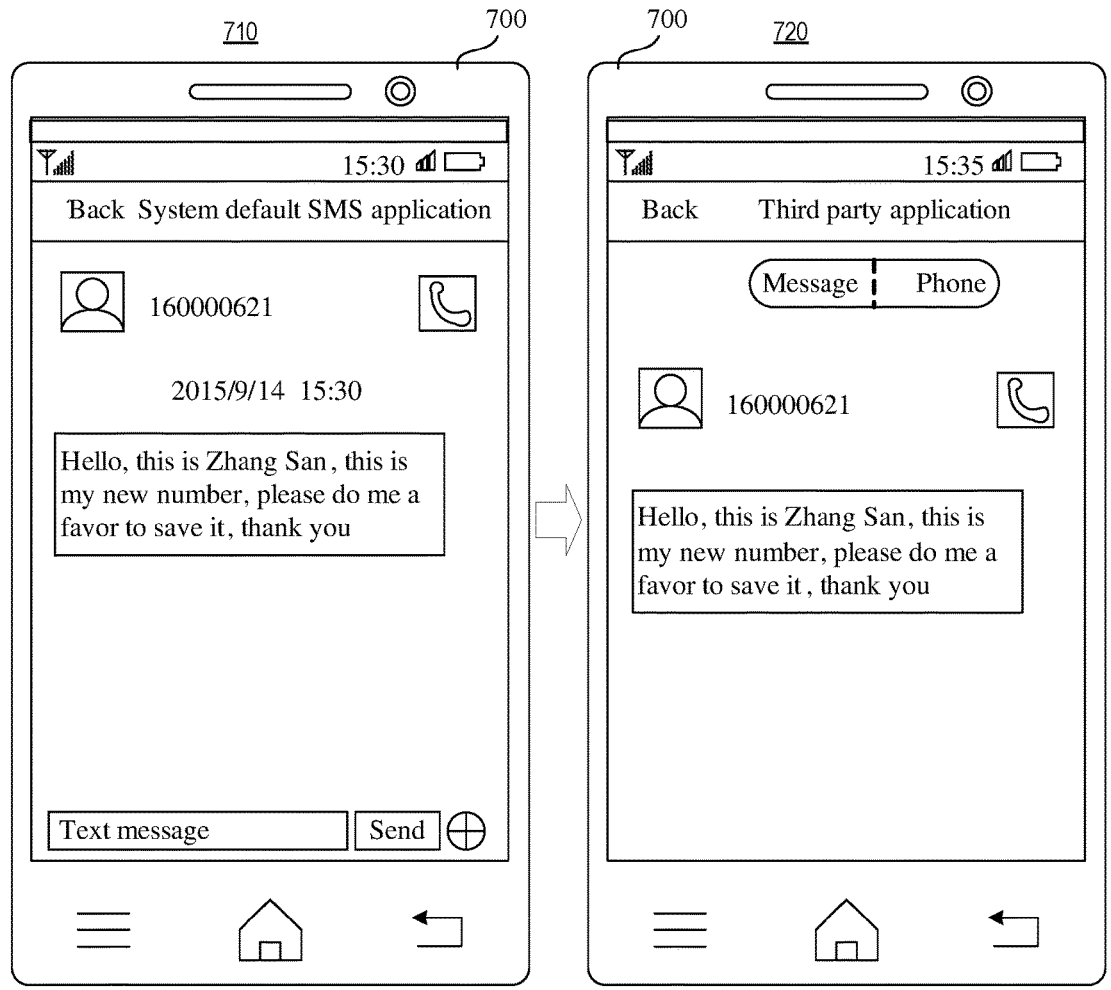
FIG. 7A shows a schematic diagram of an interface for reading an SMS according to an exemplary embodiment.

The third party applications may send a reading request for reading the common SMS to the operating system, and when the third party application is determined to have the SMS reading authority, the operating system may forward the reading request to the SMS component, and the SMS component may feed back the common SMS to the third party application, as shown in exemplary user interface 710 and 720 of exemplary mobile device 700 in FIG. 7A.

At 602: The third party application may read an SMS including predetermined information, wherein the predetermined information in the SMS may be in a non-visible state. The non-visible state may allow certain identified SMS content (e.g., identified predetermined information) to be hidden from display on a user interface of the corresponding mobile terminal. The hidden SMS content maybe hidden, for example, according to any of the hiding processes described herein.

Figure 7B:
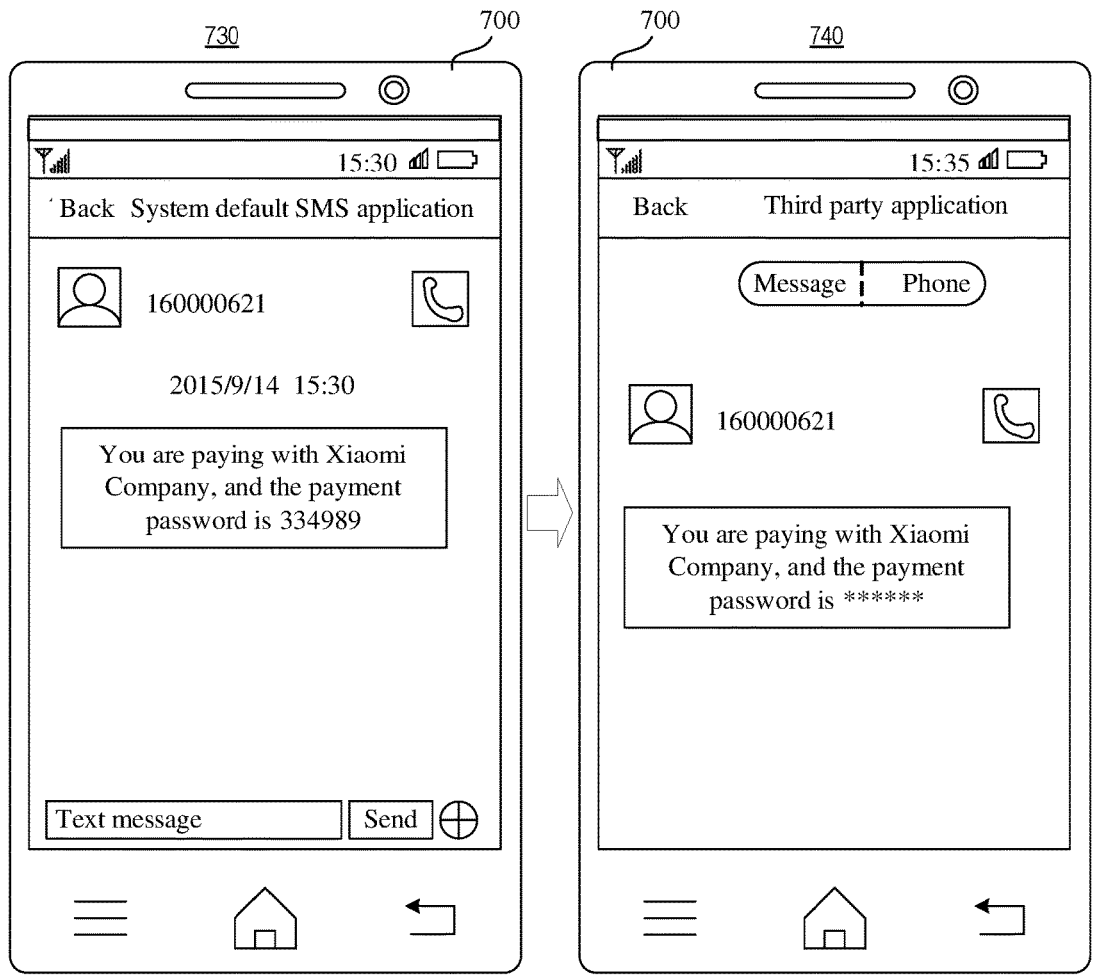
FIG. 7B shows a schematic diagram of an interface for reading an SMS according to another exemplary embodiment.

The embodiment of FIG. 3A shows a process in which the third party application reads the SMS including predetermined information. The predetermined information in the SMS may be in a visible state, as shown by exemplary user interface 730 in FIG. 7B (where predetermined information is referenced by payment password "334989"), before a hiding process is applied to the SMS to convert the predetermined information to a non-visible state, as shown by exemplary user interface 740 in FIG. 7B where the predetermined information is replaced with preset characters "******".

In the embodiment described by flowchart 600 of FIG. 6, the third party application may read an SMS in the SMS component according to two situations, while the default SMS application of the operating system reads an SMS in the SMS component in only one situation. For example, according to exemplary process 603 (not illustrated): The default SMS application of the operating system may read an SMS, and predetermined information in the SMS may be in a visible state. Thus, the default SMS application of the operating system may read an SMS in the SMS component directly, and predetermined information in the SMS may be in a visible state.

The following description refers to device embodiments of the present disclosure, which may be used for executing the method and processes of the present disclosure. Please refer to the method embodiments of the present disclosure for details not disclosed in the device embodiments of the present disclosure.

Figure 8:
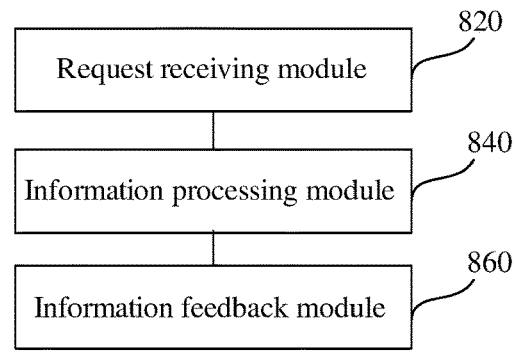
FIG. 8 shows a block diagram of an SMS reading device according to an exemplary embodiment.

FIG. 8 shows a block diagram of an SMS reading device 800 according to an exemplary embodiment. The SMS reading device 800 may be implemented as a mobile device or a part of the mobile device by a combination of software and hardware. The SMS reading device 800 includes, but is not limited to, a request receiving module 820, configured to receive a reading request for reading an SMS from a third party application. The SMS reading device 800 may further include an information processing module 840 configured to hide, when the SMS is determined to include predetermined information, the predetermined information within the SMS. The SMS reading device 800 may further include an information feedback module 860, configured to feed back the processed SMS to the third party application.

Each module described herein may be a combination of software, hardware, firmware, and middleware configured to implement features described as being implemented by the module.

In the SMS reading device 800 provided in FIG. 8, a reading request for reading an SMS may be received from a third party application, and when the SMS is determined to include predetermined information, the predetermined information in the SMS may be hidden, and the processed SMS with the hidden predetermined information may be fed back to the third party application. This solves the problem that a malicious application can read a verification code in an SMS to acquire an authority of executing a predetermined operation due to the reason that a third party application only having an SMS reading authority at the operating system level can read all SMSs in an SMS component and prohibiting a third party application from reading an SMS carrying predetermined information, thus avoiding leakage of the predetermined information in the SMS while implementing authority control over a single SMS granularity.

Figure 9:
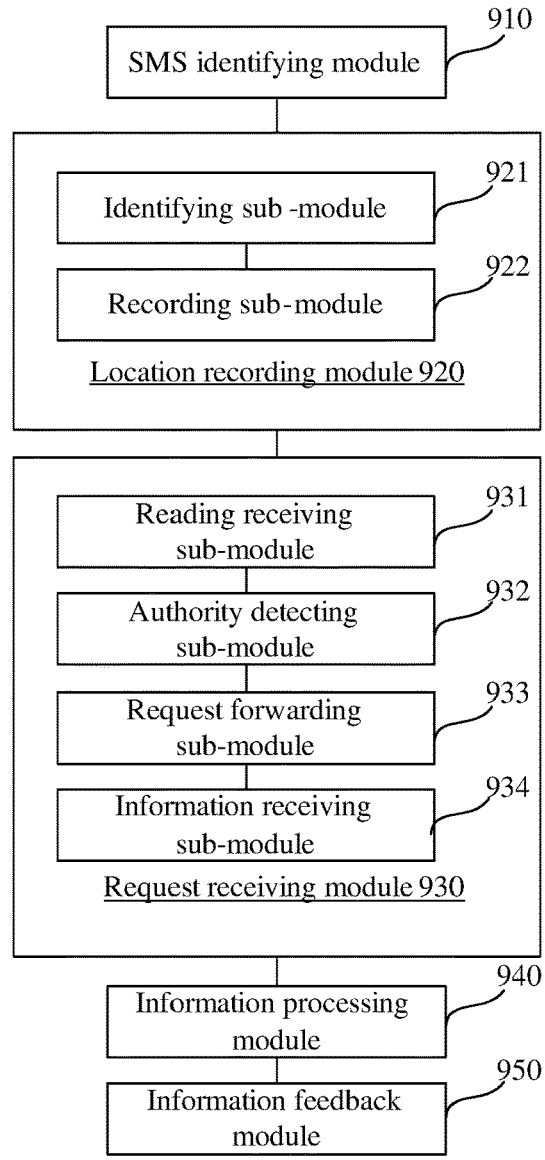
FIG. 9 shows a block diagram of an SMS reading device according to another exemplary embodiment.

FIG. 9 shows a block diagram of an SMS reading device 900 according to another exemplary embodiment. The SMS reading device 900 may be implemented as a mobile device or a part of the mobile device by combination of software or hardware. The SMS reading device 900 may include, for example, an SMS identifying module 910 configured to identify whether a received SMS includes predetermined information. Alternatively, or in addition to, the SMS identifying module 910 may be further configured to identify, according to characteristic information of the SMS, whether the SMS includes predetermined information, wherein the characteristic information includes at least one of a sender number, an SMS content, or an SMS template.

The SMS reading device 900 may further include a location recording module 920 configured to record, when the SMS is determined to include predetermined information, the location of the predetermined information in the SMS.

The location recording module 920 may include an identifying sub-module 921 configured to identify the location of the predetermined information in the SMS by comparing the SMS to one or more SMS templates to identify a corresponding SMS template that includes data fields for presenting predetermined information. After identifying the corresponding SMS template, the identifying sub-module 921 may determine the location of the predetermined information in the SMS to correspond to a location of predetermined information in the corresponding SMS template.

The location recording module 920 may further include a recording sub-module 922 configured to record the location of the predetermined information in the SMS. The location of the predetermined information may be stored as part of the data defining the SMS. In addition or alternatively, the location of the predetermined information may be stored on a memory of SMS reading device 900 or a server corresponding to a third party application that requested reading of the SMS.

The SMS reading device 900 may further include a request receiving module 930 configured to receive from a third party application a reading request for reading the SMS.

The request receiving module 930 may include a reading receiving sub-module 931 configured to receive from the third party application the reading request for reading the SMS through an operating system.

The request receiving module 930 may further include an authority detecting sub-module 932 configured to detect, through the operating system, whether the third party application has an SMS reading authority.

The request receiving module 930 may further include a request forwarding sub-module 933 configured to forward, when the third party application has the SMS reading authority, the reading request to an SMS component through the operating system.

The request receiving module 930 may further include an information receiving sub-module 934 configured to receive, through the SMS component, the reading request forwarded by the operating system.

The request receiving module 930 may further include an information processing module 940 configured to hide, when the SMS is determined to include predetermined information, the predetermined information in the SMS.

According to some embodiments, the information processing module 940 may be configured to at least replace the predetermined information in the SMS with a preset symbol.

According to some embodiments, the information processing module 940 may be configured to at least replace the predetermined information in the SMS with preset prompt information.

According to some embodiments, the information processing module 940 may be configured to at least encrypt the predetermined information in the SMS.

The SMS reading device 900 may further include an information feedback module 950 that may be configured to feed back the processed SMS to the third party application.

In the SMS reading device 900 provided in FIG. 9, a reading request for reading an SMS may be received from a third party application, and when the SMS is determined to include predetermined information, the predetermined information in the SMS may be hidden, and the processed SMS including the hidden predetermined information may be fed back to the third party application. Therefore, a problem may be solved where a malicious application reads a verification code in an SMS to acquire an authority of executing a predetermined operation due to the reason that a third party application only having an SMS reading authority at the operating system level can read all SMSs in an SMS component and prohibiting a third party application from reading an SMS carrying predetermined information, thus avoiding leakage of the predetermined information in the SMS while implementing authority control over a single SMS granularity.

The location of the predetermined information may be recorded and the content of the predetermined information may be hidden, thus avoiding leakage of the predetermined information in the SMS. In the meanwhile, only an SMS carrying predetermined information may be hidden, thereby implementing authority control over a single SMS granularity.

Only the processing of predetermined information in an SMS may be added in the SMS component, thereby implementing authority control over a single SMS granularity, and achieving the effect of simple and convenient operation and easy implementation.

Figure 10:
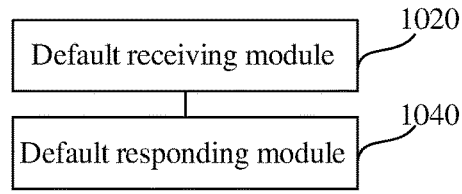
FIG. 10 shows a block diagram of an SMS reading device according to still another exemplary embodiment.

In the embodiment of FIG. 9, all reading requests forwarded by the operating system to the SMS component may be reading requests sent by third party applications. A default SMS application of the operating system may also read an SMS content of the SMS component, as shown by exemplary mobile device 1000 in FIG. 10.

The mobile device 1000 may include a default receiving module 1020 configured to receive, from a default SMS application of an operating system, a reading request of reading the SMS.

The mobile device 1000 may also include a default responding module 1040 configured to respond to the reading request of the default SMS application.

Figure 11:
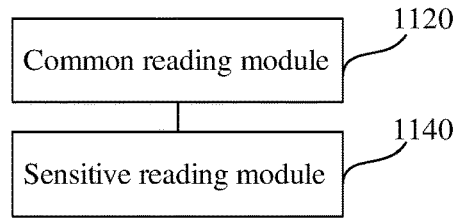
FIG. 11 shows a block diagram of an SMS reading device according to still another exemplary embodiment.

Since SMSs in the SMS component may be divided into SMSs including predetermined information and common SMSs not including predetermined information, there may be two situations in which the third party application also reads an SMS in the SMSs, as shown by exemplary mobile device 1100 in FIG. 11:

The exemplary mobile device 1100 may include a common reading module 1120, configured to read a common SMS for a third party application, wherein an SMS content of the common SMS is in a visible state.

The exemplary mobile device 1100 may also include a predetermined reading module 1140, configured to read an SMS carrying predetermined information for the third party application, wherein the predetermined information in the SMS is in a non-visible state.

The default SMS application of the operating system may read a common SMS and an SMS including predetermined information in only one situation, where the following module may be applicable: a default reading module, configured to read an SMS for the default SMS application of the operating system, wherein the predetermined information in the SMS is in a visible state (not shown in the figure).

Specific methods for modules in the devices in the embodiments above to execute operations have been expounded in the embodiments related to the method, and will not be elaborated and described in details herein.

An embodiment of the present disclosure further provides an SMS reading device. The device may be configured to implement an SMS reading method provided by an embodiment of the present disclosure. The device includes: a processor; and a memory configured to store an instruction executable by the processor, wherein the processor is configured to: receive from a third party application a reading request of reading an SMS, when the SMS is an SMS carrying predetermined information, hide the predetermined information in the SMS, and feed back the processed SMS to the third party application.

An embodiment of the present disclosure further provides an SMS reading device. The device may be configured to implement an SMS reading method provided by an embodiment of the present disclosure. The device includes: a processor; and a memory configured to store an instruction executable by the processor, wherein the processor is configured to: read a common SMS for a third party application, wherein an SMS content of the common SMS is in a visible state, and read an SMS carrying predetermined information for the third party application, wherein the predetermined information in the SMS is in an invisible state.

Figure 12:
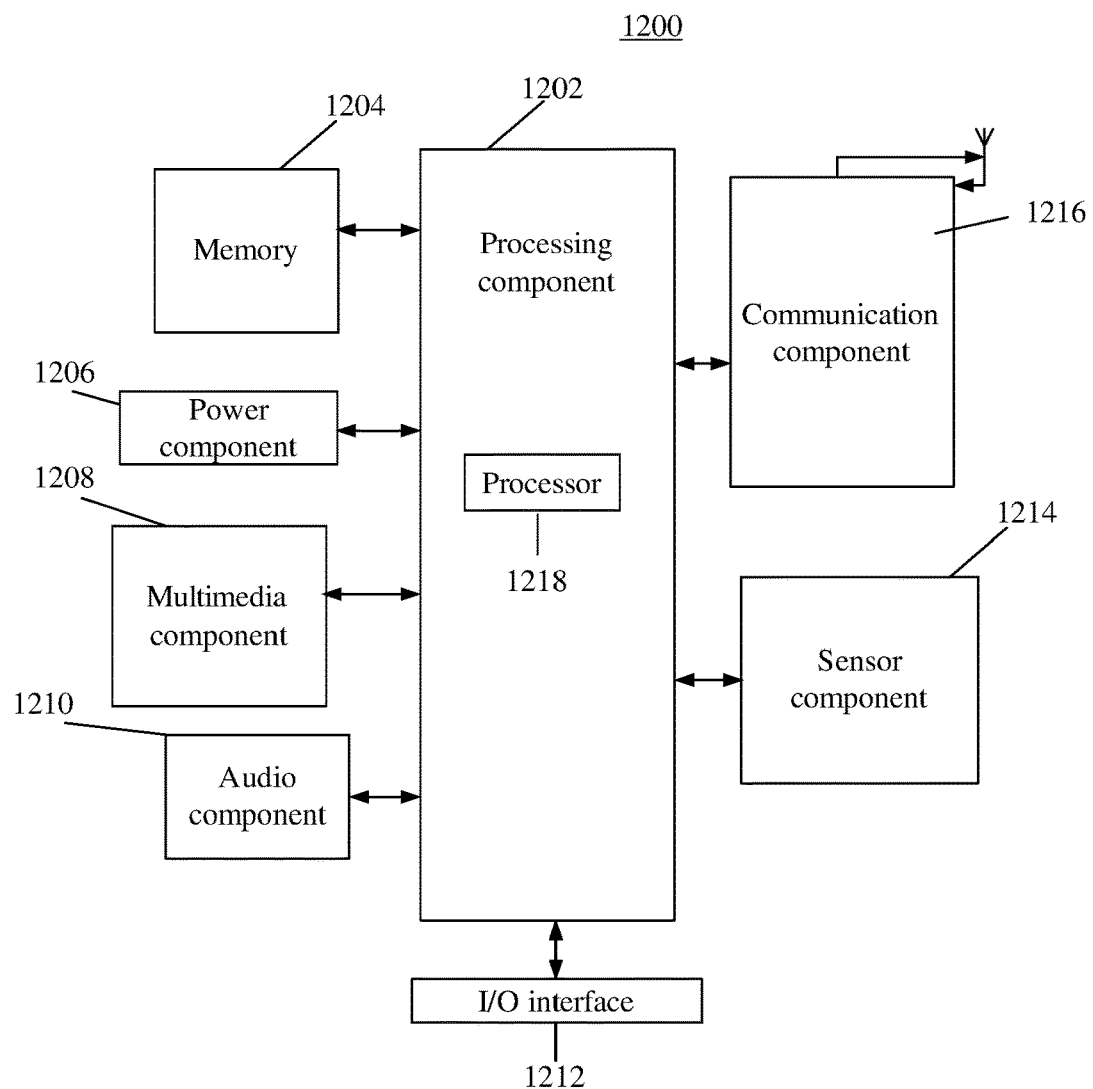
FIG. 12 shows a block diagram of an SMS reading device according to an exemplary embodiment.

FIG. 12 is a block diagram of an SMS reading device according to an exemplary embodiment. For example, the device 1200 may be a mobile phone, a computer, a digital broadcasting terminal, a message transceiver, a game console, a tablet device, a medical device, a fitness device, a personal digital assistant and so on.

Referring to FIG. 12, the device 1200 may include one or more of the following components: a processing component 1202, a memory 1204, a power component 1206, a multimedia component 1208, an audio component 1210, an Input/Output (I/O) interface 1212, a sensor component 1214 and a communication component 1216.

Generally, the processing component 1202 controls overall operations of the device 1200, such as operations associated with display, a telephone call, data communication, a camera operation and a recording operation. The processing component 1202 may include one or more processors 1218 to execute instructions so as to perform e all or part of the steps of the method. Besides, the processing component 1202 may include one or more modules, so as to process interaction between the processing component 1202 and other components. For example, the processing component 1202 may include a multimedia module so as to facilitate interaction between the multimedia component 1208 and the processing component 1202.

The memory 1204 is configured to store various types of data so as to support operations in the device 1200. Examples of such data include instructions of any applications or methods operated on the device 1200, contact data, phonebook data, messages, pictures, video and so on. The memory 1204 may be implemented using any type of volatile or non-volatile storage devices, or a combination thereof, such as a Static Random-Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic disk or an optical disk.

The power component 1206 provides power for various components of the device 1200. The power component 1206 may include a power source management system, one or more power sources, and other components associated with power generation, management and distribution of the device 1200.

The multimedia component 1208 includes a screen providing an output interface between the device 1200 and a user. In some embodiments, the screen may include a Liquid Crystal Display (LCD) and a Touch Panel (TP). When the screen includes a TP, the screen may be implemented as a touch screen to receive an input signal from the user. The TP includes one or more touch sensors so as to sense a touch, a slide, and a gesture on the TP. The touch sensor may not only sense a touch or a boundary of a slide, but also detect a duration and a pressure related to the touch or the slide. In some embodiments, the multimedia component 1208 includes a front camera and/or a rear camera. When the device 1200 is in an operation mode, such as a camera mode or a video mode, the front camera and/or the rear camera may receive external multimedia data. Each front camera and each rear camera may be a fixed optical lens system or may be provided with a focal distance or an optical zooming capability.

The audio component 1210 is configured to output and/or input an audio signal. For example, the audio component 1210 includes a Microphone (MIC). When the device 1200 is in an operation mode, such as a calling mode, a recording mode and a voice recognition mode, the MIC is configured to receive an external audio signal. The received audio signal may be further stored in the memory 1204 or sent by the communication component 1216. In some embodiments, the audio component 1210 further includes a loudspeaker, configured to output the audio signal.

The I/O interface 1212 provides an interface between the processing component 1202 and a peripheral interface module. The peripheral interface module may be a keyboard, a click wheel, a button and so on. These buttons may include, but are not limited to a homepage button, a volume button, a start button and a lock button.

The sensor component 1214 includes one or more sensors configured to provide status assessments of various aspects of the device 1200. For example, the sensor component 1214 may detect an open/closed state of the device 1200, and the relative locations of the components. For example, the components are the display and the keypad of the device 1200. The sensor component 1214 may further detect a change in position of the device 1200 or a component of the device 1200, the presence of contact between the user and the device 1200, an orientation or an acceleration/deceleration of the device 1200 and a change in the temperature of the device 1200. The sensor component 1214 may include a proximity sensor, configured to detect the presence of a nearby object without any physical contact. The sensor component 1214 may further include an optical sensor, such as a Complementary Metal Oxide Semiconductor (CMOS) or a Charge Coupled Device (CCD) image sensor, configured to be used in an imaging application. In some embodiments, the sensor component 1214 may further include an acceleration sensor, a gyro sensor, a magnetic sensor, a pressure sensor or a temperature sensor.

The communication component 1216 is configured to facilitate wired or wireless communication between the device 1200 and other devices. The device 1200 may be accessed into a wireless network based on a communication standard, such as Wireless Fidelity (WiFi), the second Generation (2G) or the third Generation (3G), or a combination thereof. In an exemplary embodiment, the communication component 1216 receives a broadcast signal from an external broadcast management system or broadcast related information through a broadcast channel. In an exemplary embodiment, the communication component 1216 further includes a Near Field Communication (NFC) module so as to promote short distance communication. For example, the NFC module may be implemented based on a Radiofrequency Identification (RFID) technology, an Infrared Data Association (IrDA) technology, an Ultra Wide Band (UWB) technology, a Bluetooth (BT) technology and other technologies.

In an exemplary embodiment, the device 1200 may be implemented with one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, microcontrollers, microprocessors, or other electronic components, and configured to execute the SMS reading method above.

In exemplary embodiments, there is also provided a non-transitory computer-readable storage medium including instructions, such as included in the memory 1204, executable by the by the processor 1218 of the device 1200, for performing the SMS reading method above. For example, the non-temporary computer readable storage medium may be a ROM, a Random-Access Memory (RAM), a Compact Disc-ROM (CD-ROM), a magnetic tape, a floppy disk, an optical data memory and so on.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

INDUSTRY APPLICABILITY

A reading request of reading an SMS is received from a third party application, and if the SMS is an SMS including predetermined information, the predetermined information in the SMS may be hidden according to a hiding process, and the processed SMS may be fed back to the third party application. This thereby solves the problem that a malicious application can read a verification code in an SMS to acquire an authority of executing a predetermined operation due to the reason that a third party application only having an SMS reading authority at the operating system level can read the content of an SMS in an SMS component, and prohibiting the third party application from reading an SMS carrying predetermined information, thus avoiding leakage of the predetermined information in the SMS while implementing authority control over a single SMS granularity.

What is claimed is:

1. A method for reading an electronic message on a device, the method comprising:
  receiving, by an electronic message component running on the device, an electronic message transmitted through a communication network in communication with the device, wherein the electronic message includes both predetermined information and presentable information;
  receiving, from a default electronic message application of an operating system, a reading request for reading the electronic message;
  responding to the reading request of the default electronic message application;
  receiving, by the operating system of the device, a reading request for reading the electronic message communicated from a third party application running on the device;
  determining, by the operating system, whether the third party application has an electronic message reading authority;
  when the third party application is determined to have the electronic message reading authority, transmitting the reading request to the electronic message component through the operating system;
  determining whether the electronic message includes the predetermined information based on a comparison of the electronic message to a list of predetermined information;
  when the electronic message is determined to include the predetermined information, modifying the electronic message into a modified electronic message by formatting the predetermined information in the electronic message while maintaining the presentable information; and transmitting the modified electronic message with the formatted predetermined information to the third party application.

2. The method of claim 1, wherein formatting the predetermined information in the electronic message comprises:
at least replacing the predetermined information in the electronic message with a preset symbol.

3. The method of claim 1, wherein formatting the predetermined information in the electronic message comprises:
at least replacing the predetermined information in the electronic message with preset prompt information.

4. The method of claim 1, wherein formatting the predetermined information in the electronic message comprises:
at least encrypting the predetermined information in the electronic message.

5. The method of claim 1, further comprising:
when the electronic message is determined to include the predetermined information, determining a location of the predetermined information in the electronic message; and
storing the location of the predetermined information in the electronic message.

6. The method of claim 1, wherein the list of predetermined information includes at least one of a sender number, an electronic message content, or an electronic message template.

7. The method of claim 5, wherein recording the location of the predetermined information in the electronic message comprises:
identifying the location of the predetermined information in the electronic message based on a corresponding electronic message template; and
recording the location of the predetermined information in the electronic message.

8. A device for reading an electronic message, the device comprising:
a processor; and
a memory configured to store instructions executable by the processor,
wherein the processor is configured to execute the instructions to:
receive, by an electronic message component running on the device, an electronic message transmitted through a communication network in communication with the device, wherein the electronic message includes both predetermined information and presentable information;
receive, from a default SMS application of an operating system, a reading request of reading the SMS;
respond to the reading request of the default SMS application;
receive, by the operating system of the device, a reading request for reading the electronic message communicated from a third party application running on the device;
determine, by the operating system, whether the third party application has an electronic message reading authority;
when the third party application is determined to have the electronic message reading authority, transmit the reading request to the electronic message component through the operating system;
determine whether the electronic message includes the predetermined information based on a comparison of the electronic message to a list of predetermined information;
when the electronic message is determined to include the predetermined information, modifying the electronic message into a modified electronic message by formatting the predetermined information in the electronic message while maintaining the presentable information; and
transmit the modified electronic message with the formatted predetermined information to the third party application.

9. The device of claim 8, wherein the processor is further configured to execute the instructions to:
at least replace the predetermined information in the electronic message with a preset symbol.

10. The device of claim 8, wherein the processor is further configured to execute the instructions to:
at least replace the predetermined information in the electronic message with preset prompt information.

11. The device of claim 8, wherein the processor is further configured to execute the instructions to:
at least encrypt the predetermined information in the electronic message.

12. The device of claim 8, wherein the processor is further configured to execute the instructions to:
determine, when the electronic message is determined to include the predetermined information, a location of the predetermined information in the electronic message; and
store the location of the predetermined information in the electronic message.

13. The device of claim 8, wherein the list of predetermined information includes at least one of a sender number, an electronic message content, or an SMS template.

14. The device of claim 12, wherein the processor is further configured to execute the instructions to:
identify the location of the predetermined information in the electronic message based on a corresponding electronic message template; and
record the location of the predetermined information in the electronic message.

15. A non-transitory computer-readable storage medium having stored therein instructions that, when executed by a processor of a mobile device, causes the mobile device to perform a method for reading an electronic message, wherein the method comprises:
receiving, by an electronic message component running on the device, an electronic message transmitted through a communication network in communication with the device, wherein the electronic message includes both predetermined information and presentable information;
receiving, from a default SMS application of an operating system, a reading request of reading the SMS;
respond to the reading request of the default SMS application;
receiving, by an operating system of the device, a reading request for reading the electronic message communicated from a third party application running on the device;
determining, by the operating system, whether the third party application has an electronic message reading authority;
when the third party application is determined to have the electronic message reading authority, transmitting the reading request to the electronic message component through the operating system;

determining whether the electronic message includes the predetermined information based on a comparison of the electronic message to a list of predetermined information;

when the electronic message is determined to include the predetermined information, modifying the electronic message into a modified electronic message by formatting the predetermined information in the electronic message while maintaining the presentable information; and transmitting the modified electronic message with the formatted predetermined information to the third party application.

16. The non-transitory computer-readable storage medium of claim 15, wherein formatting the predetermined information in the electronic message comprises:

at least replacing the predetermined information in the electronic message with a preset symbol;

at least replacing the predetermined information in the electronic message with preset prompt information; or at least encrypting the predetermined information in the electronic message.

\* \* \* \* \*